United States Patent
Young et al.

(10) Patent No.: US 11,310,379 B1
(45) Date of Patent: Apr. 19, 2022

(54) PRINTHEAD STATE GUI FOR PRINTERS

(71) Applicants: Nathan Young, Boulder, CO (US); Ziling Zhang, Boulder, CO (US); Kara Larsen, Boulder, CO (US); Scott R. Johnson, Erie, CO (US)

(72) Inventors: Nathan Young, Boulder, CO (US); Ziling Zhang, Boulder, CO (US); Kara Larsen, Boulder, CO (US); Scott R. Johnson, Erie, CO (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/195,110

(22) Filed: Mar. 8, 2021

(51) Int. Cl.
*H04N 1/00* (2006.01)
*B41J 2/045* (2006.01)
*G06F 3/12* (2006.01)
*H04N 1/60* (2006.01)

(52) U.S. Cl.
CPC .......... *H04N 1/0044* (2013.01); *B41J 2/0451* (2013.01); *B41J 2/04586* (2013.01); *G06F 3/1208* (2013.01); *G06F 3/1256* (2013.01); *H04N 1/00029* (2013.01); *H04N 1/00045* (2013.01); *H04N 1/00411* (2013.01); *H04N 1/6063* (2013.01)

(58) Field of Classification Search
CPC combination set(s) only.
See application file for complete search history.

(56) References Cited

U.S. PATENT DOCUMENTS

| 6,371,590 | B1 | 4/2002 | Hah |
| 6,533,384 | B1 | 3/2003 | Vega et al. |
| 6,565,179 | B1 | 5/2003 | Bruch et al. |
| 6,652,064 | B2 | 11/2003 | Bruch et al. |
| 7,338,144 | B2 | 3/2008 | Mantell et al. |
| 9,016,819 | B2 | 4/2015 | Ono |
| 9,145,020 | B2 | 9/2015 | Cupit |
| 9,288,360 | B1 | 3/2016 | Dennison |

(Continued)

FOREIGN PATENT DOCUMENTS

| JP | 5169511 B2 | 3/2013 |
| KR | 101208453 B1 * | 12/2012 |

(Continued)

OTHER PUBLICATIONS

Elevate your high-speed color inkjet productivity; DigitalEyes; www.videk.com/LinkClick.

(Continued)

*Primary Examiner* — Barbara D Reinier
(74) *Attorney, Agent, or Firm* — Duft & Bornsen, PC

(57) ABSTRACT

Systems and methods are provided for reviewing printed jobs. On embodiment is a system comprising a print review device. The print review device includes a memory that stores an image of a test pattern printed by printheads of a printer, and a controller that generates a Graphical User Interface (GUI), for presentation at a display, depicting states of the printheads based on the image, receives input from a user selecting one of the printheads, correlates the printhead with a portion of the image, and presents the portion of the image for review at the GUI. The controller also identifies locations on the portion that are correlated with nozzles of the printhead, and selectively highlights the locations based on state information for the nozzles.

20 Claims, 9 Drawing Sheets

(56) References Cited

U.S. PATENT DOCUMENTS

| | | | |
|---|---|---|---|
| 9,415,600 B2 | 8/2016 | Derleth et al. | |
| 10,545,844 B2 | 1/2020 | Dennison | |
| 2002/0141639 A1* | 10/2002 | Steinberg | H04N 1/6033 |
| | | | 382/167 |
| 2008/0036803 A1 | 2/2008 | Yun | |
| 2015/0373305 A1 | 12/2015 | Hauf et al. | |
| 2018/0086049 A1* | 3/2018 | Ueshima | B41J 2/04586 |
| 2019/0168514 A1* | 6/2019 | Gazala | B41J 2/0451 |
| 2021/0178752 A1* | 6/2021 | Johnson | B41J 2/16579 |
| 2021/0183036 A1* | 6/2021 | Gurudath | B41J 2/0451 |

FOREIGN PATENT DOCUMENTS

| | | | |
|---|---|---|---|
| WO | 2018185515 A1 | 10/2018 | |
| WO | 2020239820 A1 | 12/2020 | |

OTHER PUBLICATIONS

Kye-Si Kwon et al. Low-cost and high speed monitoring system for a multi-nozzle piezo inkjet head; Elsevier Sensors and Actuators A 180 (2012) 154-165.
U.S. Appl. No. 16/711,751.
U.S. Appl. No. 16/712,985.
Ricoh User Guide; Ricoh Pro VC60000.

* cited by examiner

PRINTHEAD STATE GUI FOR PRINTERS

TECHNICAL FIELD

The following disclosure relates to the field of printing, and in particular, to analysis of printed output.

BACKGROUND

Entities with substantial printing demands typically use a production printer. A production printer is a high-speed printer used for volume printing, such as a continuous-forms printer that prints on a web of print media stored on a large roll. A production printer typically includes a localized print controller that manages the overall operation of the printer, and one or more marking engines (sometimes referred to as an "imaging engine" or a "print engine"). The marking engine includes one or more arrays of printheads.

Upon receiving a print job, the print controller rasterizes logical pages of the job (e.g., to create bitmaps representing each page of the job), and the marking engine operates individual printheads to mark the web based on the rasterized logical pages. Thus, the printer marks physical pages based on the digital information of the print job.

In order to ensure that a print job has been printed at a desired level of quality, it is not uncommon for the output of a print job to be scanned. However, for print jobs that comprise thousands of pages, it is not feasible for a technician to manually review scans of those pages. Furthermore, a scanner may require its own maintenance and upkeep.

Thus, those who operate print shops continue to seek out enhanced systems and methods that permit the review of print jobs to be accomplished in an efficient and accurate manner.

SUMMARY

Embodiments described herein dynamically process images of test patterns to highlight locations marked by nozzles that are in an abnormal or unexpected state. This enables a print shop operator to quickly determine the state of nozzles that are not marking print media as expected. Thus, the print shop operator is capable of more rapidly identifying printheads that are due for cleaning, replacement, or other forms of remediation.

On embodiment is a system comprising a print review device. The print review device includes a memory that stores an image of a test pattern printed by printheads of a printer, and a controller that generates a Graphical User Interface (GUI), for presentation at a display, depicting states of the printheads based on the image, receives input from a user selecting one of the printheads, correlates the printhead with a portion of the image, and presents the portion of the image for review at the GUI. The controller also identifies locations on the portion that are correlated with nozzles of the printhead, and selectively highlights the locations based on state information for the nozzles.

A further embodiment is a method that includes storing an image of a test pattern printed by printheads of a printer, directing a display to generate a Graphical User Interface (GUI), for presentation at a display, and depicting states of the printheads based on the image. The method also includes receiving input from a user selecting one of the printheads, correlating the printhead with a portion of the image, presenting the portion of the image for review at the GUI, identifying locations on the portion that are correlated with nozzles of the printhead, and selectively highlighting the locations based on state information for the nozzles.

A further embodiment is a non-transitory computer readable medium embodying programmed instructions which, when executed by a processor, are operable for performing a method. The method includes storing an image of a test pattern printed by printheads of a printer, directing a display to generate a Graphical User Interface (GUI), for presentation at a display, and depicting states of the printheads based on the image. The method also includes receiving input from a user selecting one of the printheads, correlating the printhead with a portion of the image, presenting the portion of the image for review at the GUI, identifying locations on the portion that are correlated with nozzles of the printhead, and selectively highlighting the locations based on state information for the nozzles.

Other illustrative embodiments (e.g., methods and computer-readable media relating to the foregoing embodiments) may be described below.

DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION

The figures and the following description illustrate specific illustrative embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
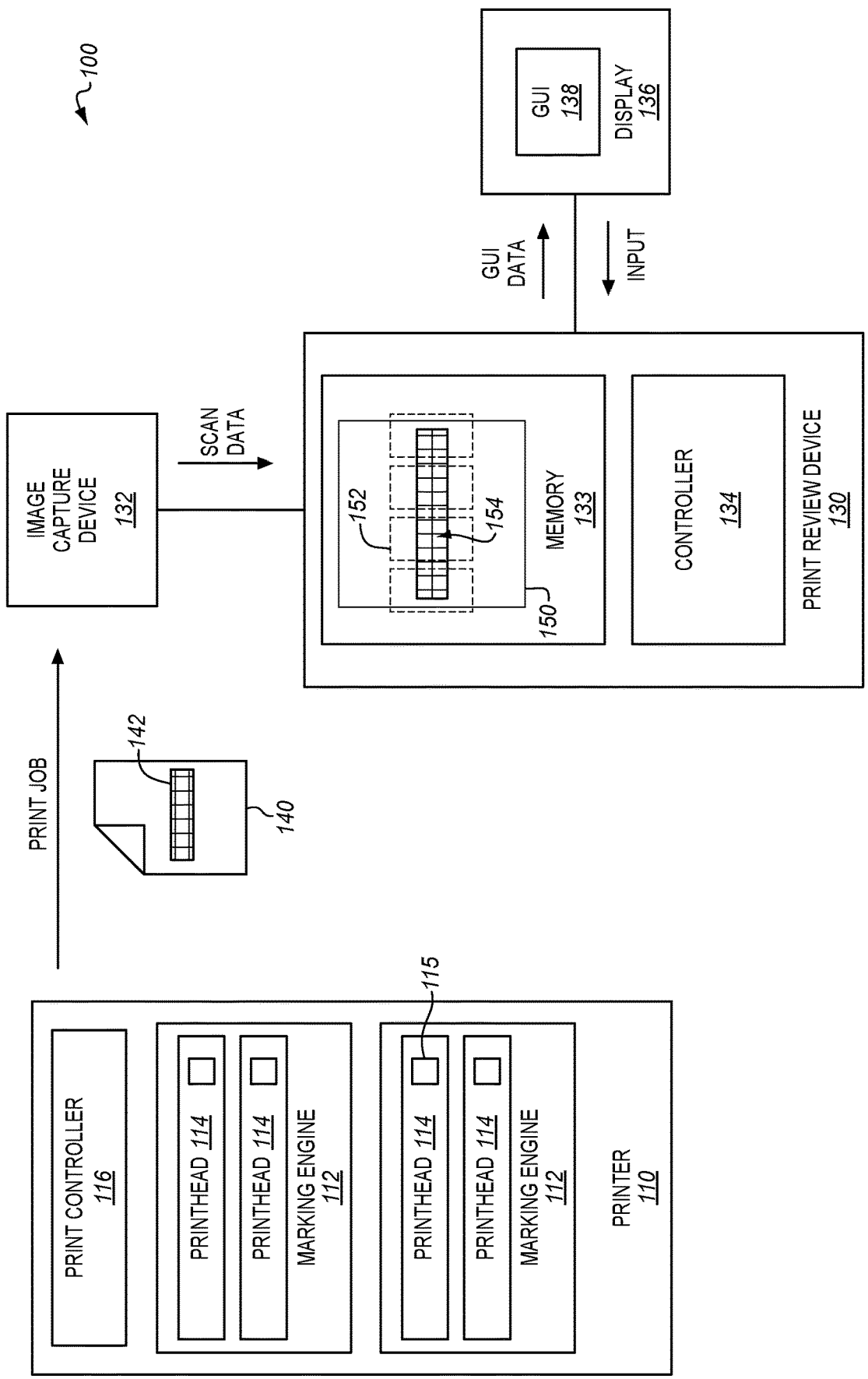
FIG. 1 is a block diagram of a print review system in an illustrative embodiment.

FIG. 1 is a block diagram of a print review system 100 in an illustrative embodiment. Print review system 100 comprises any system, device, or component operable to analyze images 150 of print media 140 that has been marked with a test pattern 142 in accordance with print data in a print job. Print review system 100 has been enhanced to dynamically present portions 152 of the images 150 for review. Each of the portions 152 depicts the output of an entire printhead 114. Locations 154 within the portions 152 are highlighted by print review system 100 to indicate the output of nozzles 115 that are in an abnormal state (e.g., an error state) and/or an unclean state.

In this embodiment, print review system 100 comprises a print review device 130 (e.g., a print server) that reviews images 150 of print media 140 marked with a test pattern 142 by a printer 110. The images 150 are generated by an image capture device 132 (e.g., a scanner), and the image capture device 132 may be disposed downstream of marking engines 112 and printheads 114 of the printer 110.

A controller 134 at the print review device 130 detects the state of individual nozzles based on the images 150 of the print media 140, and directs the operations of a display 136 that presents a GUI 138 to a print shop operator. In this embodiment, print review device 130 has been enhanced to dynamically analyze and highlight marks made by individual nozzles 115 of printheads 114 at the printer 110. This dynamic highlighting is based on review of images 150 provided by image capture device 132. Specifically, print review device 130 displays portions 152 of the image 150 for review, and highlights locations 154 which are indicative of specific nozzles 115 being in an abnormal state.

As used herein, a state of a nozzle 115 or printhead 114 comprises any physical, electrical, or other state relating to the ability to eject ink onto print media 140 in accordance with instructions supplied by print controller 116. Examples of states for a nozzle 115 include "jetout" wherein the nozzle 115 fails to apply ink, "malfunctioning" wherein the nozzle 115 jets an irregular pattern, "misaligned" wherein the nozzle 115 fails to mark the correct widthwise location on the print media 140, and "fully operational" wherein the nozzle 115 applies ink in accordance with instructions. The state of individual nozzles 115 may be determined by reviewing images 150 of test patterns 142 marked by printer 110, and mapping locations 154 within the test patterns 142 to nozzles 115 at printheads 114. The mapping may be based on one or more of nozzle location information, images of printed test patterns, printing instructions for test patterns, and/or the current configuration of the printer 110.

Printer 110 comprises any system, device, or component operable to mark the print media 140 (e.g., paper, card stock, paper board, corrugated fiberboard, film, plastic, synthetic, textile, glass, composite or any other tangible medium suitable for printing) in accordance with received instructions in print data for a print job. In this embodiment, printer 110 comprises a continuous-forms printer that marks a web of print media 140 which travels through the printer 110 in a web direction (also referred to as a "process direction"). However, in further embodiments printer 110 may comprise a cut-sheet printer or other type of printer that marks sheets or strips of print media 140. In this embodiment, printer 110 includes a print controller 116 that directs the operations of one or more marking engines 112, which each comprise one or more arrays of printheads 114. The printheads 114 each operate hundreds of nozzles 115 to eject ink and/or other marking materials onto print media 140 in accordance with instructions from the print controller 116.

Image capture device 132 comprises any device capable of generating images 150 of the printed output of printer 110. In one embodiment, image capture device 132 is integrated into the printer 110. In further embodiments, image capture device 132 is coupled to a web of print media 140 at a location that is downstream of the printer 110 with respect to a direction along which the web proceeds. Image capture device 132 may comprise an optical scanner, camera, densitometer, etc. Image capture device 132 may periodically acquire images of the print media 140 via a single camera or an array of cameras. In embodiments where an array of cameras is used, the image capture device 132 may stitch images from cameras in the array together, in order to generate a composite image that extends across a width of the print media 140 (i.e., a direction perpendicular to the direction that the print media travels).

In one embodiment, image capture device 132 scans the print media 140 periodically and/or in real-time as the printer 110 continues marking the print media 140 and the print media 140 advances. For example, image capture device 132 may time acquisition of images 150 such that the images 150 each depict an instance of a test pattern 142 that is periodically printed by the printer 110 onto the print media 140 (e.g., every page, every ten pages, every one hundred pages, etc.). In one embodiment, the printer 110 is capable of printing at a higher number of Dots Per Inch (DPI) than the image capture device 132 (e.g., twelve hundred DPI as printed, as compared to six hundred DPI as scanned). In such an embodiment, a test pattern 142 may be split and printed into physically distinct sections, wherein each section utilizes a different combination of nozzles 115 to print at the DPI rate supported by the image capture device 132, enabling accurate review and analysis. In a further embodiment, the resolution of images 150 acquired by the image capture device 132 is chosen such that each pixel in the image corresponds with a size equal to or less than that of a droplet of ink applied by a nozzle 115 at a printhead 114.

The images 150 acquired by the image capture device 132 are stored by print review device 130 in memory 133, and are analyzed by a controller 134. Controller 134 comprises any system, component, or device that characterizes images 150 of print media 140 that has been marked by a printer 110. To perform this operation, controller 134 may compare the images 150 to corresponding target data (e.g., as stored in memory 133) that represents an ideal image of print media 140 that has been marked exactly in accordance with the instructions for a print job. In further embodiments, controller 134 also operates image capture device 132. Controller 134 may be implemented as custom circuitry, as a hardware processor executing programmed instructions, etc.

Based on a comparison of the images 150 of print media 140 to target data, controller 134 is capable of detecting and/or reporting states of individual nozzles 115 of printheads 114. For example, controller 134 may detect the presence of defects such as jetouts at specific nozzles 115, in accordance with the techniques described in U.S. patent application Ser. No. 16/712,985 filed on Dec. 12, 2019, entitled "ENHANCED PRINT DEFECT DETECTION," and herein incorporated by reference.

Controller 134 generates a GUI 138 that notifies a print shop operator of the states of the nozzles 115, and directs display 136 to present the GUI 138. Display 136 comprises any suitable device for visually displaying digital information, such as a monitor, projector, touchscreen, etc. The display 136 may be provided as part of a separate device such as a mobile phone or tablet in communication with the print review device 130 via wireless or other protocols. In one embodiment, the display 136 comprises a component of the print review device 130. Depending on embodiment, image capture device 132, print review device 130, and/or display 136 may be implemented as separate devices coupled for communication, or as integral components of the same device.

The particular arrangement, number, and configuration of components described herein is illustrative and non-limiting. Illustrative details of the operation of print review system 100 will be discussed with regard to FIG. 2. Assume, for this embodiment, that a printer 110 has received print data for a print job (e.g., Portable Document Format (PDF) data accompanied by a Job Definition Format (JDF) job ticket), and has initiated printing of the print job onto print media 140. This includes the printer 110 marking the test patterns 142 (e.g., a series of stripes or other patterns marked with ink from the printheads 114) onto the print media. As the print media 140 advances from the printer 110, it passes downstream into view of image capture device 132.

Image capture device 132 performs a scan of print media 140 marked by the printer 110 to generate images 150 of the test patterns 142 marked onto the print media 140. A scan may be performed after printer 110 has been turned on, after printer 110 has been set up in a new configuration, at the start of a new print job, in response to a manual command, every certain number of pages or linear feet of print media, etc. The image 150 may comprise a static image (e.g., digital images in a format such as Joint Photographic Experts Group (JPEG), Graphics Interchange Format (GIF), Portable Network Graphics (PNG), etc.), a frame of video footage, or other content. The images 150 are acquired at a resolution that enables a quality of test patterns 142 marked print media 140 to accurately analyzed. For example, the images 150 may be acquired at a resolution that equals the print quality of the current job (e.g., six hundred Dots Per Inch (DPI), twelve hundred DPI, etc.), or at a resolution wherein at least one pixel exists to represent output from each nozzle 115 at each printhead 114 of the printer 110.

Figure 2:
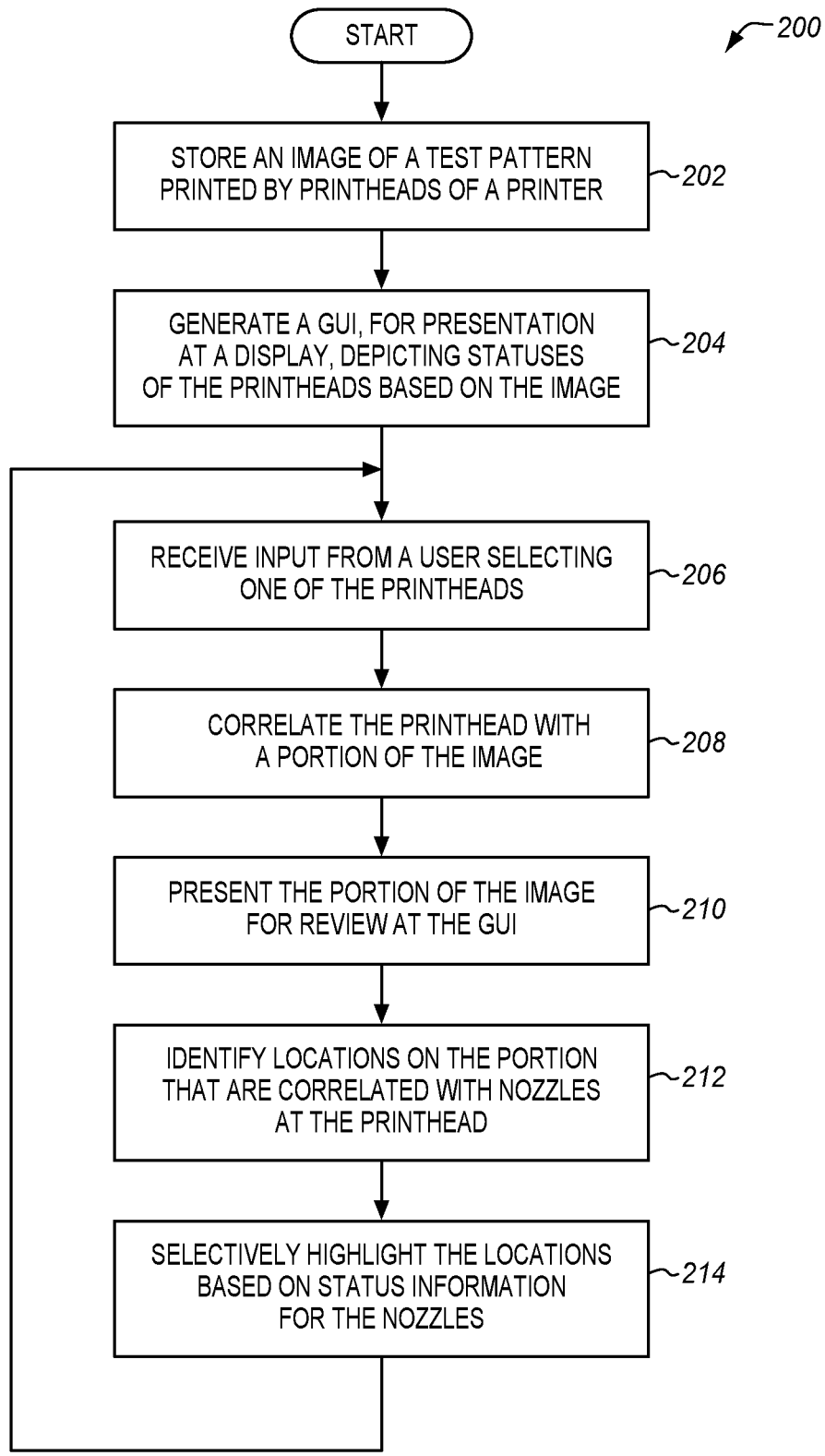
FIG. 2 is a flowchart illustrating a method for operating a print review system to selectively highlight portions of an image of a test pattern to indicate the states of nozzles that generated the test pattern.

FIG. 2 is a flowchart illustrating a method 200 for operating a print review system to selectively highlight portions of an image of a test pattern to indicate the states of nozzles that generated the test pattern. The steps of method 200 are described with reference to print review system 100 of FIG. 1, but those skilled in the art will appreciate that method 200 may be performed in other systems. The steps of the flowcharts described herein are not all inclusive and may include other steps not shown. The steps described herein may also be performed in an alternative order.

Step 202 of method 200 includes storing an image 150 of a test pattern 142 printed by printheads 114 of the printer 110. This step may be performed via communications between the print review device 130 and the image capture device 132. In one embodiment, the controller 134 receives the images 150 directly from the image capture device 132, while in further embodiments the controller 134 is implemented remotely from the image capture device 132 and receives the images 150 via a network or file system. The memory 133 of the print review device 130 stores the images 150 of the print media 140, and these images 150 are reviewed by controller 134. In one embodiment, controller 134 processes the image 150 by scaling and rotating the image 150 to place any test patterns 142 depicted in the image 150 into a predetermined orientation. This may be performed by analyzing scan targets (e.g., cross-hairs, symbols, etc.) within the image 150 to detect differences in scale and/or angle of orientation, and then applying mathematical transformations to enforce a desired scale and/or angle of orientation upon the image 150.

In a further embodiment, controller 134 enhances the visibility of marks within the test pattern 142 by converting the image 150 to a monochrome color space (e.g., a black and white color space). Many printheads 114 for color printers may print in colors that have low contrast with an underlying print media. For example, magenta and cyan have lower contrast with a white print media than does key black. Yellow has a particularly low contrast. By converting the image 150 to monochrome, and setting the threshold for black low enough to convert yellow to black, a print shop operator may beneficially detect applied marking materials that are yellow, without eye strain.

The controller 134 proceeds to detect states of printheads 114 at the printer 110 by comparing the image 150 to target data stored in memory 133. In one embodiment, this operation comprises reviewing test patterns 142 depicted in the images 150, and comparing the test patterns 142 to those depicted in target data. If the test patterns 142 do not match the target data at specific locations 154 along a width of the print media, this may be indicative of a nozzle 115 in an abnormal state. If more than a threshold number of nozzles 115 are in an abnormal state, then a printhead 114 that includes those nozzles 115 may be flagged as being in an abnormal state. Further analysis may be performed in accordance with the techniques discussed in U.S. patent application Ser. No. 16/712,985 in order to identify defects related to printing. Different types of discrepancies may be indicative of different types of states for a nozzle 115 and/or printhead 114. In a further embodiment, this operation is performed by reading state data stored in memory 133. The state data indicates printhead states detected by another device or component.

In step 204, controller 134 generates a GUI 138 for presentation at display 136. The GUI 138 depicts states of the printheads 114 based on the image 150. In one embodiment, the GUI 138 comprises code and/or instructions for rendering one or more interactive elements for presentation at a display 136. The code and/or instructions may further provide for tracking the operations of a print shop operator via a mouse, touchscreen, or other user interface device as the print shop operator selects the interactive elements. Code and/or instructions for the GUI 138 are transmitted to the display 136, which presents the GUI 138 for review. In one embodiment, the controller 134 directs the display 136 to highlight entire printheads 114 that are in an error state. For example, printheads 114 that are in an error state may be indicated with a distinct color and/or pattern in order to draw the attention of the print shop operator. A printhead 114 may be set to an error state based on criteria set by a print shop operator. For example, if more than a threshold number of nozzles 115 within a printhead 114 are in an error state, and/or more than a threshold number of nozzles 115 within the printhead 114 are in a persistent error state that does not change after a threshold number of cleaning cycles, then the printhead 114 may be indicated as in an error state.

In step 206, the controller 134 receives input from a user (e.g., the print shop operator) selecting one of the printheads 114. In one embodiment, this comprises the print shop operator clicking on an interactive element at the GUI 138 that represents a specific printhead 114 of the marking engine 112. For example, the print shop operator may click on an interactive element for a printhead 114 in an error state.

In step 208, the controller 134 correlates the printhead 114 with a portion 152 of the image 150. The portion 152 is a segment of the image 150 that represents an area of the test pattern 142 that was marked by the printhead 114. In one embodiment, the controller 134 determines which printhead 114 has been selected, and consults a table in memory 133 that maps output from the selected printhead 114 to a range of coordinates of the image 150. For example, the range may comprise a set of X and Y coordinates within the image 150, comprising a fraction of the entirety of the image 150.

In step 210, the controller 134 presents the portion 152 of the image 150 for review at the GUI 138. In one embodiment, this comprises transmitting the portion 152 of the image to the display 136 for presentation within the GUI 138. In one embodiment, the portion 152 is accompanied by interactive elements that facilitate review of the portion 152.

In step 212, the controller 134 identifies locations 154 on the portion 152 that are correlated with nozzles 115 at the printhead 114. In one embodiment, this is performed by consulting a table that maps nozzles 115 to locations 154 within the portion 152, such as locations within a small range of ten to one hundred vertical pixels, which are only a pixel wide, or are only several pixels wide.

In step 214, the controller 134 selectively highlights the locations 154 based on state information for the nozzles 115. Selectively highlighting a location 154 comprises applying a color or distinctive symbol at or near the location 154 that draws attention to the location 154. In many embodiments, selective highlighting is used to indicate nozzles 115 which are in an error state (e.g., encountering a jetout or having low ink output), and nozzles 115 which are being ignored (e.g., because they are disposed outside of the print area for the current print job), but not to indicate nozzles 115 that are functioning normally.

In one embodiment, selectively highlighting the locations 154 comprises directing the display 136 to present symbols such as regions of color at the locations 154. Each type of symbol corresponds with a different state. For example, locations 154 representing areas marked by nozzles 115 that are being ignored may be colored gray, and locations 154 representing areas marked by nozzles 115 in a jetout state may be colored blue. Locations 154 representing areas marked by nozzles 115 that have an impaired jet may be colored red, and locations 154 representing areas marked by nozzles 115 that are firing in the wrong widthwise position and/or lengthwise position on the print media may be colored yellow.

In further embodiments, additional symbols may be applied to each location 154 where a nozzle 115 does not return to a ready state after multiple cleanings. For example, a location 154 indicative of a jetout that has existed for at least three cleaning cycles in a row may be marked with a "X" on top of any color used to represent the jetout state. The "X" may comprise a darker shade of the color used to represent the jetout state, may comprise the color black, etc. Steps 206-214 may be iteratively repeated in response to user input as a print shop operator inspects a variety of printheads 114 at the printer 110.

Selectively highlighting locations 154 which are indicative of abnormal operations of nozzles 115 is highly beneficial. This form of annotation increases the ability of a print shop operator to detect the locations at which discrepancies in a test pattern 142 have been detected, and provides information helping to classify those discrepancies. This information can be used in turn to inform a print shop operator considering replacing, cleaning, or otherwise remediating a printhead 114. Furthermore, many displays are not capable of perfectly representing the content of an image 150, owing to the image 150 potentially being very large. By selectively presenting portions of the image 150, method 200 enables a print shop operator to review the image on a piecewise basis without artifacts induced by substantially scaling the image 150.

Figure 3:
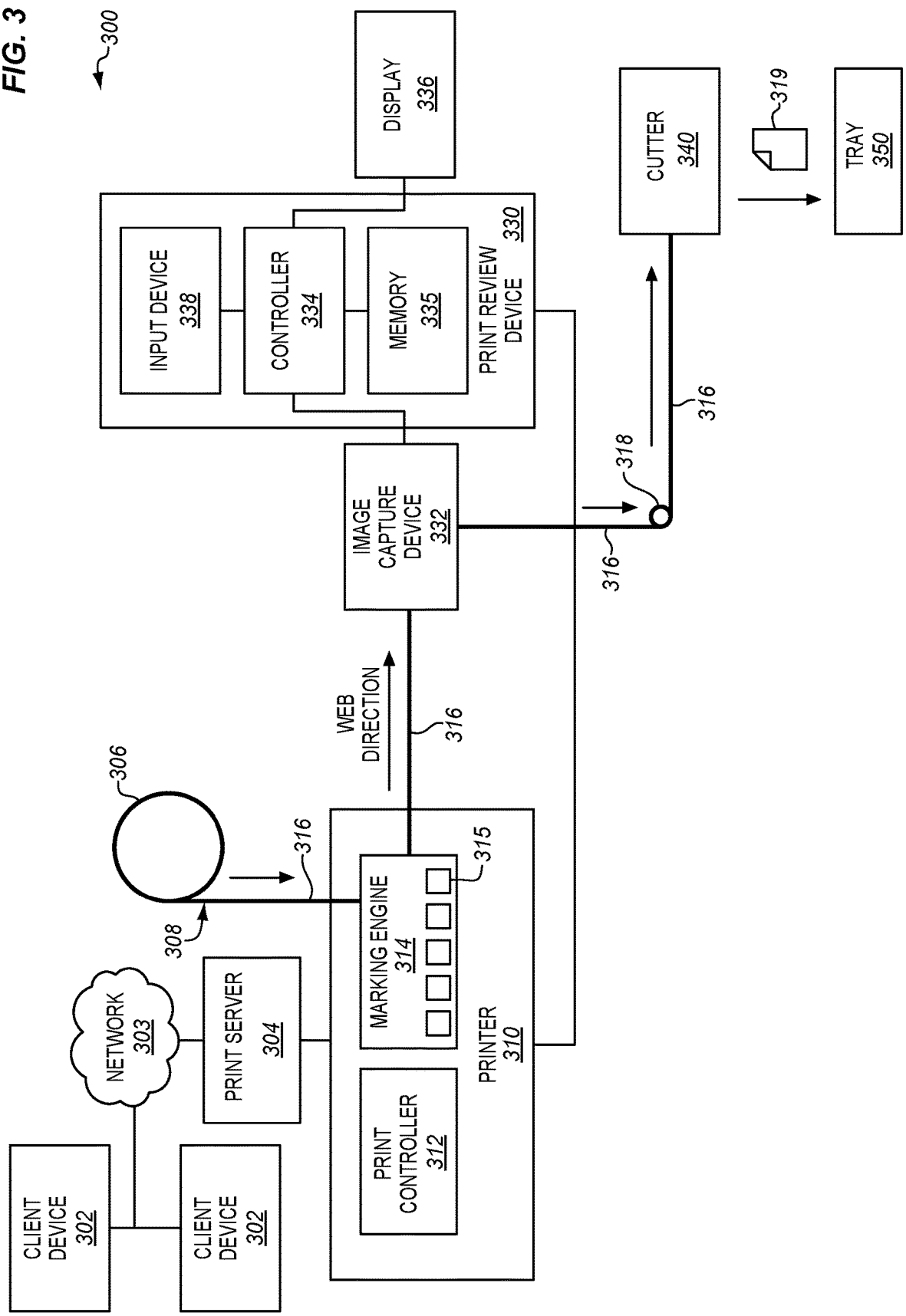
FIG. 3 is a block diagram of a print shop in an illustrative embodiment.

FIG. 3 is a block diagram of a print shop 300 in an illustrative embodiment. Specifically, FIG. 3 illustrates a print shop environment in which print media may be reviewed. According to FIG. 3, a print server 304 at the print shop 300 receives print jobs from one or more client devices 302 (e.g., via a network 303 such as the Internet). The print jobs may comprise print data accompanied by a job ticket. The print server 304 schedules the print jobs for printing at one or more printers 310. To initiate printing of an individual print job, print server 304 transmits the print job to a printer 310. A print controller 312 at the printer 310 processes (e.g., rasterizes) the print data for the job in accordance with a job ticket for the print job, and generates instructions for a marking engine 314 at the printer 310.

The marking engine 314 receives a web 316 of print media 308 from an unwinder 306, and marks the web 316 using printheads 315 which apply ink or another marking material (e.g., fluids, liquids, powders, etc. that are suitable for printing) to the web 316. Portions of the web 316 that have been marked advance downstream in a web direction to image capture device 332. As these portions of the web 316 pass by image capture device 332, the image capture device 332 acquires images of the web 316, and these images are stored in memory 335. These images may be acquired each time a test pattern is recognized, periodically as new test patterns pass the image capture device 332, or continuously in real-time. The portions of the web 316 advance to a cutter 340, via roller 318. The cutter 340 cuts the portions into pages 319 for stacking into a tray 350. In another embodiment, the portions of the web 316 exit the image capture device 332 and advance towards a rewinder device that replaces cutter 340 (e.g., a roll-to-roll configuration).

Images acquired via image capture device 332 are accessed by controller 334, which reviews the images in order to detect the states of printheads and nozzles. In this embodiment, controller 334 is coupled for communication with print controller 312 of printer 310, network 303 and/or print server 304. In such an embodiment, the controller 334 is configured to detect notifications based on communications with a print controller 312 of the printer, and include the additional notifications in a GUI. Examples of such notifications include a state of the printer 310 itself (e.g., pertaining to the existence of needed firmware upgrades, paper jam issues, etc.). In this embodiment, image capture device 332 also provides notifications that are not directly related to the print job. For example, image capture device 332 may report that a camera at the image capture device 332 has stopped functioning, that the image capture device 332 was unable to locate a test pattern on the web 316, etc.

In one embodiment, controller 334 combines the various received notifications together for presentation at a GUI via display 336. Notifications of printhead conditions may then be reviewed via input device 338 (e.g., a keyboard and mouse, custom set of input buttons, touchscreen, etc.).

Figure 4:
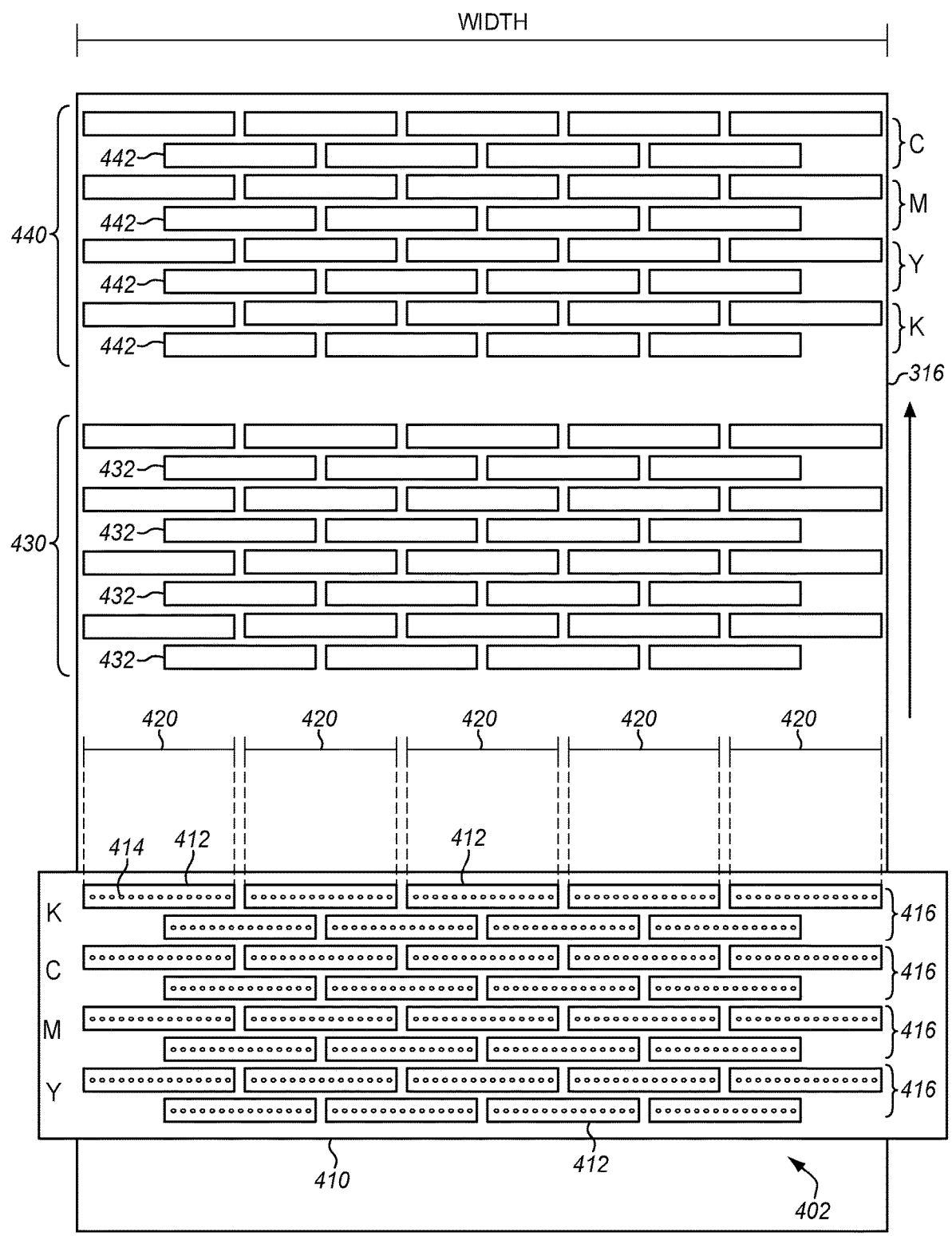
FIG. 4 depicts a marking engine applying test patterns to a web of print media in an illustrative embodiment.

FIG. 4 depicts a marking engine 402 applying test patterns 430 and 440 to a web 316 of print media in an illustrative embodiment. In this embodiment, test patterns 430 and 440 include bands 432 and 442 for color planes of Cyan (C), Magenta (M), Yellow (Y), and Key Black (K). The bands 432 and 442 are generated via the operation of marking engine 402. Specifically, one or more arrays 410 of printheads 412 operate nozzles 414 to eject ink or another marking material onto web 316 of print media. Printheads 412 and/or nozzles 414 may apply marking material for different color planes/channels (e.g., cyan, magenta, yellow, key black, protector coating, clear, etc.) by ejecting corresponding marking materials for those color planes/channels. In this embodiment, the printheads 412 occupy regions 420 that are fixed along a width of the web 316 of print media. Thus, nozzles 414 of the printheads 412 also occupy fixed positions. Hence, the expected widthwise position of marks from each nozzle 414 are known. The exact number and location of regions 420 may vary depending on the DPI of the printer and/or the image capture device. The test patterns 430 and 440 depicted in FIG. 4 may facilitate the detection of jetouts, misalignments, and/or other nozzle states, and may be printed regularly at the start of each print job, after every page, after a predefined linear distance along web 316, etc.

Figure 5:
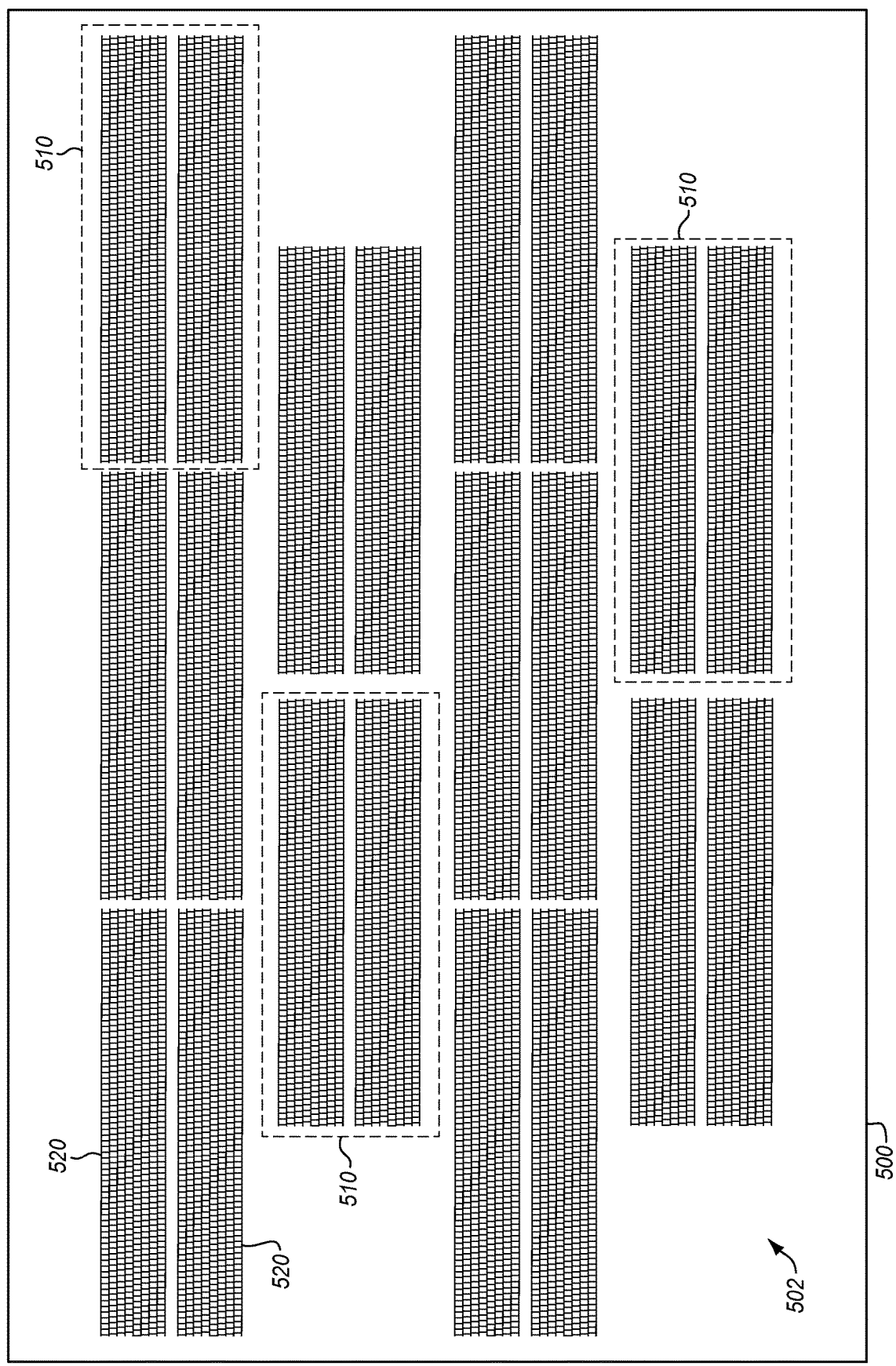
FIG. 5 depicts an image of a test pattern marked onto print media in an illustrative embodiment.

FIG. 5 depicts an image 500 of a test pattern 502 marked onto print media in an illustrative embodiment. In this embodiment, the test pattern 502 is subdivided into test regions 520. Each test region 520 is printed by a different printhead 114. The number of test regions 520 depicted in FIG. 5 is reduced in number for the sake of simplicity, but a full image 500 may comprise hundreds of test regions 520, each of which may be analyzed for the purpose of detecting states of individual nozzles at a printhead 114. In this embodiment, the image 500 is also subdivided into cleaning regions 510. Each cleaning region 510 represents a portion of the marking engine 112 that is capable of receiving independent cleaning (e.g., via a localized pressurization or suction component) separate from other cleaning regions 510. A setup where multiple printheads are designed for cleaning at the same time is common for "dual-printhead" or "quad-printhead" printers. Because of the high resolution of the image 500 (e.g., six hundred DPI or more), the image 500 may be tens of thousands of pixels wide and/or tens of thousands of pixels tall. Monitors do not support these resolutions. Thus, in many circumstances it is not possible to accurately present the entirety of image 500 for review, especially given that the output of a single nozzle represents a miniscule portion of the image 500. Downscaling of the image 500 to that of a monitor is not feasible because this introduces artifacts that make the analysis of individual nozzles an impossibility. Furthermore, detection of individual nozzle conditions would remain an incredibly visually difficult task, owing to the monitor being too small for visual analysis of the test pattern 502 without eye strain. This is an issue that the method 200 of FIG. 2 addresses, as further explained below.

Figure 6:
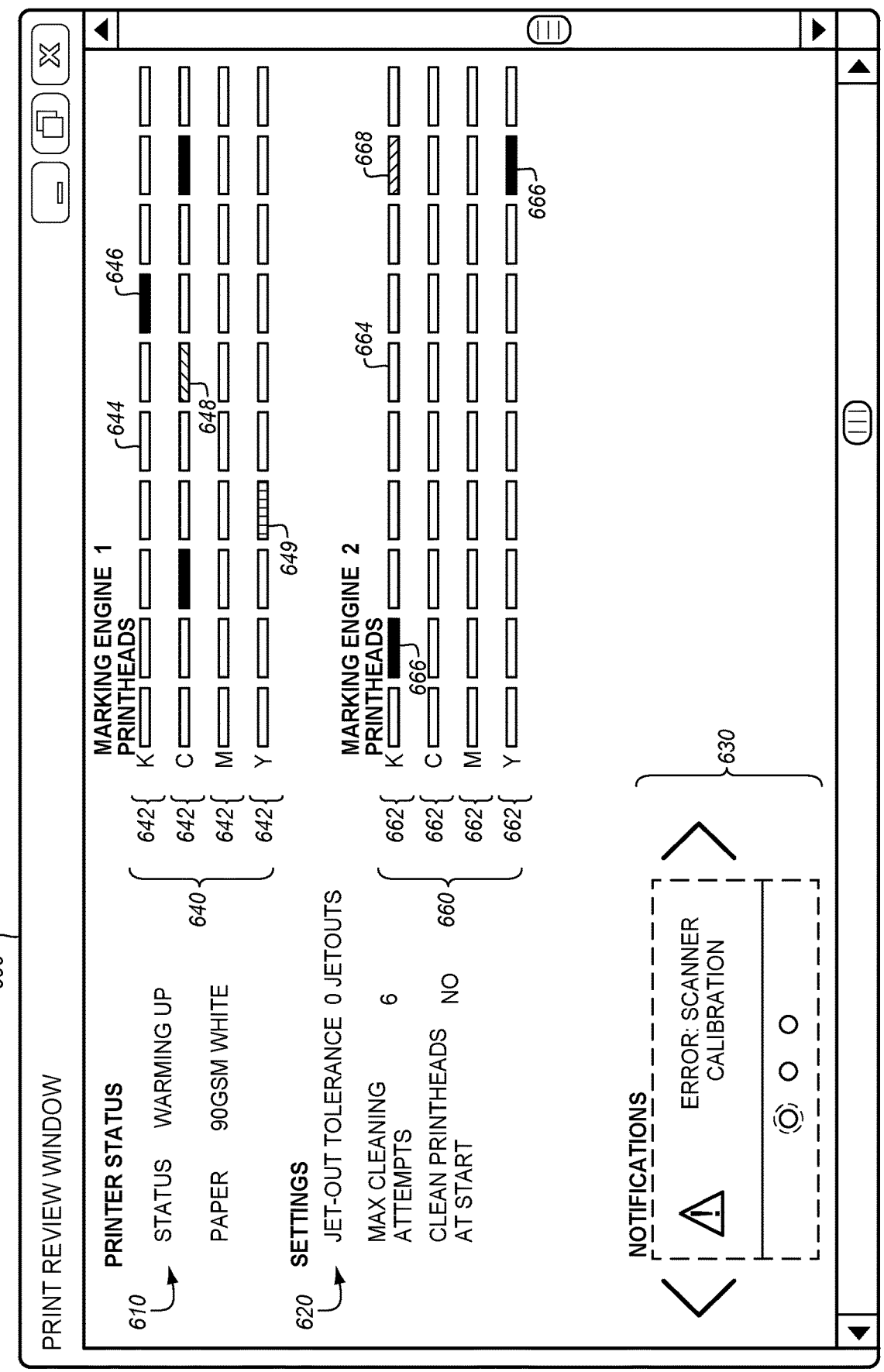
FIG. 6 depicts a Graphical User Interface (GUI) for reviewing states of printheads in an illustrative embodiment.

FIG. 6 depicts a Graphical User Interface (GUI) 600 for reviewing states of printheads 114 in an illustrative embodiment. In this embodiment, the GUI 600 is formatted according to Hypertext Markup Language (HTML) in combination with Cascading Style Sheet (CSS) data in order to present a variety of elements reporting the state of a printer. In further embodiments, other potential implementations of the GUI 600 include a native C++ application, etc. The GUI 600 accesses data stored in memory that indicates the state of each printhead 114. For the purposes of this embodiment, the primary GUI element comprises printer state regions 640 and 660. The printer state regions 640 and 660 are subdivided into color planes 642 and 662, respectively. The printer state regions 640 and 660 indicate the state of each printhead 114 of a printer 110. For example, printer state regions 640 and 660 show printheads with nozzles that are experiencing jetouts. In this embodiment, fully operational printheads 114 are indicated with symbols 644 and 664, while printheads experiencing a jetout at a threshold number of nozzles are indicated with symbols 646 and 666, and printheads 114 experiencing malfunctioning conditions are indicated with symbols 648 and 668. Symbol 649 indicates a printhead 114 with misaligned printheads. This graphical presentation of printhead state allows a technician at the print shop to rapidly and intuitively locate printheads 114 that are experiencing issues at a printer 110. In further embodiments, controller 134 refrains from applying a symbol to indicate a jetout, low ink, or misalignment condition unless a threshold number of nozzles 115 within the printhead 225 are in that state, or are persistently in that state despite a number of cleaning cycles. In one embodiment, the print shop operator defines the threshold number of nozzles and number of cleanings.

GUI 600 also includes a carousel 630. Carousel 630 depicts notifications that are relevant to printer 110 and/or print review device 130. For example, notifications at carousel 630 may indicate the availability of firmware updates, the existence of calibration issues, etc.

The elements of the GUI further include a printer state section 610, which reports the current state of a printer 110 as indicated by a print controller of the printer 110, or a print server. A settings section 620 indicates settings for the print review device 130. The settings section 620 includes an indication of a number of tolerated jet-outs allowed at printheads of the printer 110 before an error is indicated or printing is halted. The settings section 620 also indicates a maximum number of cleaning cycles to perform on a printhead 114 before an error is indicated or printing is halted, and whether or not printheads 114 are cleaned prior to the start of a print job. In this embodiment, the number of cleanings that are attempted before a printhead 114 is reported as unclean is selectable by the user for when the printer 110 prepares to print, while the number of attempts to clean before identifying a printhead as failed is separate. In one embodiment, five consecutive cleaning attempts are allowed to recover a specific nozzle 115.

Figure 7:
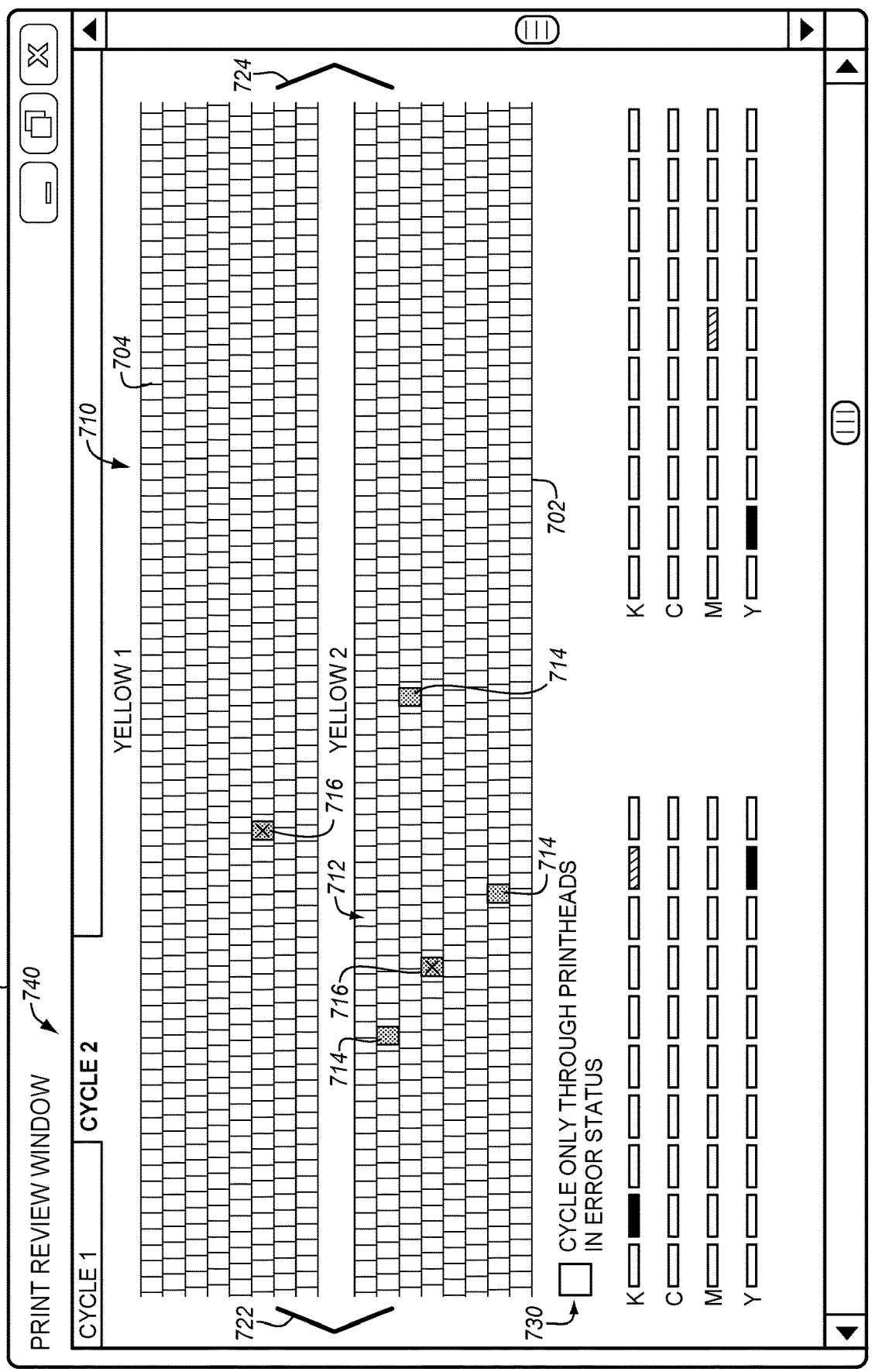
FIG. 7 depicts a GUI that highlights locations within an image of a test pattern that are indicative of a nozzle being in an error state in an illustrative embodiment.

FIG. 7 depicts a GUI 700 that highlights locations within an image of a test pattern that are indicative of a nozzle being in an error state in an illustrative embodiment. Specifically, GUI 700 presents a portion 710 that is cropped from image 500 of FIG. 5. The portion 710 corresponds with a cleaning region 510, and/or a test region 520, of the image 500. In this embodiment, each test region 520 comprises horizontal lines 702 which visually orient the viewer, and vertical lines 704. Each vertical line 704 is printed by a different nozzle 115 of a printhead 114 within a region 712. Thus, vertical lines 704 are created by single nozzles 115 on a printhead 114. Meanwhile, horizontal lines 702 provide visual guidance for visually tracking rows, and are printed by any or all the nozzles 115 on a printhead 114. Vertical lines 704 in different rows or columns are printed by different nozzles 115. When the quality of the vertical line 704 is impacted, this indicates the corresponding nozzle 115 is in an abnormal state.

With an understanding of the test regions 520 in mind, it will be understood that discrepancies in location, width, consistency, or other aspects a vertical line 704 are indicative of a nozzle being in an error state. The GUI 700 includes symbols 714 (e.g., regions of color), which are used to represent different nozzle states. The symbols 714 are placed at locations where discrepancies are detected between expected and actual markings at the portion 710. In this embodiment, symbols 716 (i.e., "X" shapes) are applied to locations that have been detected in a defect state for more than a threshold number of cleanings (e.g., two cleanings, five cleanings, etc.) or days of cleaning. This helps to indicate nozzles that are in a semi-permanent state of inoperability. GUI 700 further includes controls 722 and 724, which are utilized to scroll between portions 710 representing the output of different printheads 114. A checkbox 730 may be toggled to determine whether controls 722 and 724 scroll between only printheads 114 that are in an error state. That is, when checkbox 730 is checked, controls 722 and 724 at the GUI 700 enable an operator to advance exclusively through portions of the image 500 that are correlated with printheads 114 in an error state. When checkbox 730 is not checked, controls 722 and 724 enable a print shop operator to scroll through all printheads 114. Historical nozzle states detected after each of multiple cleaning cycles can be viewed by clicking on tabs 740.

Figure 8:
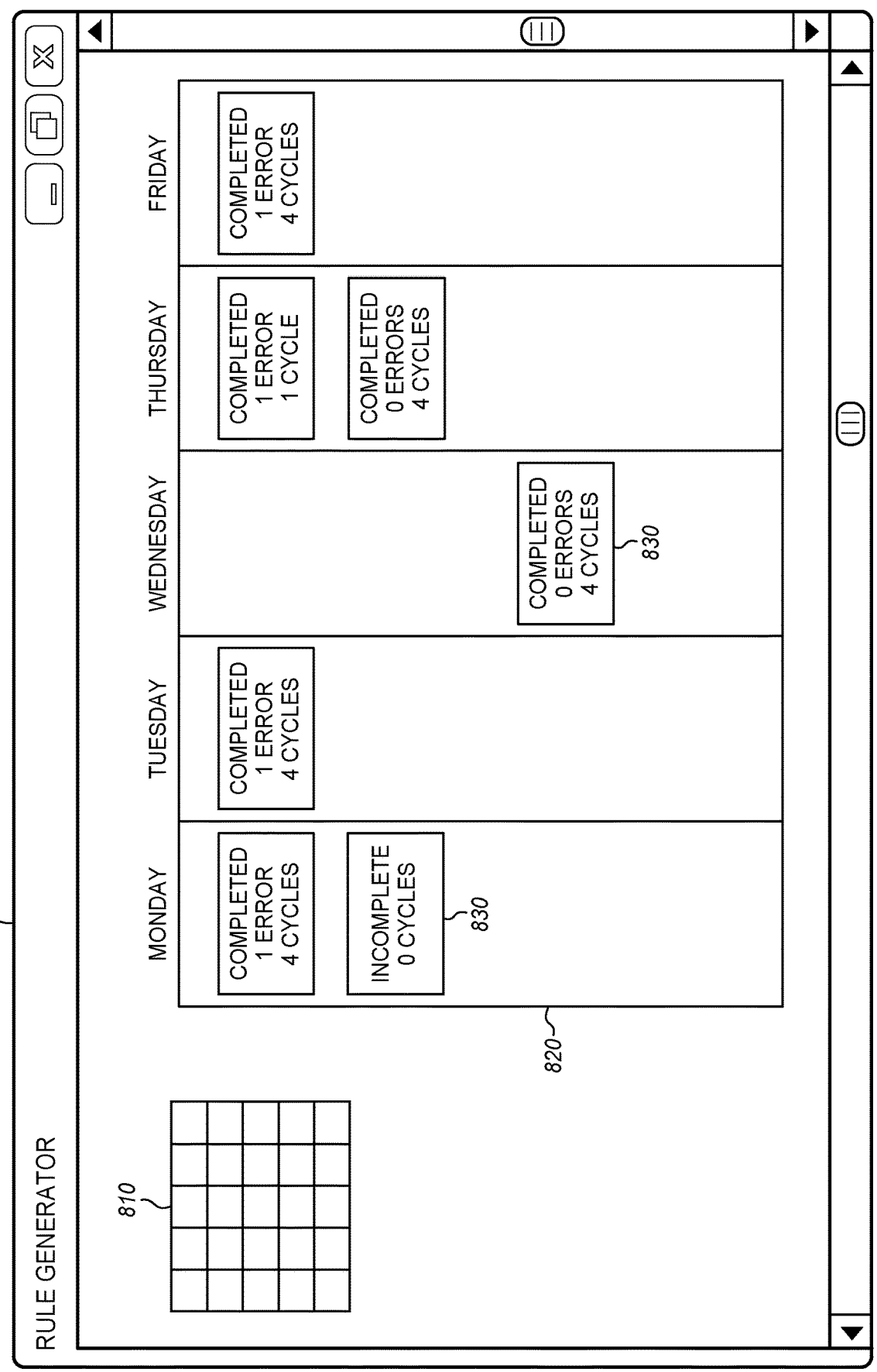
FIG. 8 depicts a GUI that presents a calendar with interactive elements for reviewing historical nozzle state information in an illustrative embodiment.

FIG. 8 depicts a GUI 800 that presents a calendar 820 with interactive elements 830 for reviewing historical nozzle state information in an illustrative embodiment. GUI 800 may be generated by controller 134 directing the display 136 to present the calendar 820. The calendar 820 enables an operator to select historical images 150 of test patterns for review. In this embodiment, clicking on mini-calendar 810 selects a given week or day. The calendar 820 then presents interactive elements 830 (e.g., entries) for that time period. By clicking on an interactive element 830, the specific nozzle states for printheads 114 may be reported via a GUI similar to GUI 700 of FIG. 7. Thus, calendar 820 enables rapid viewing and consideration of nozzle states across a long span of time.

Figure 9:
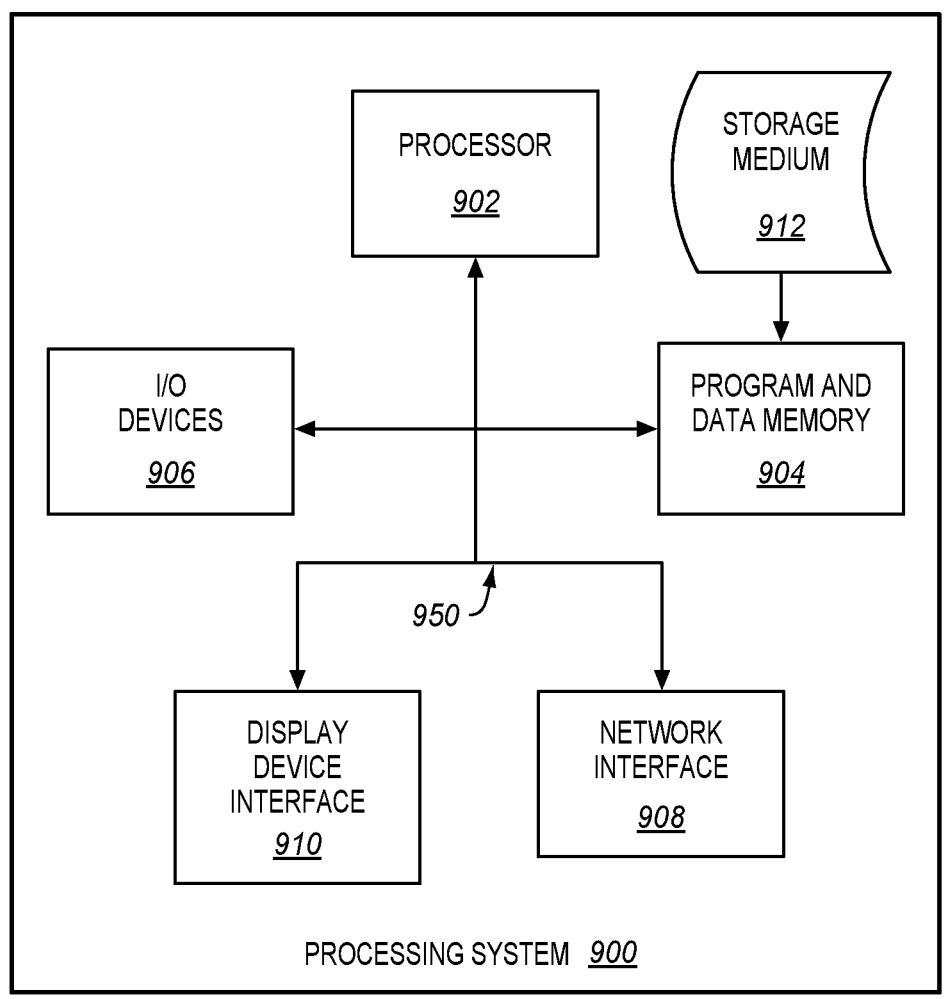
FIG. 9 illustrates a processing system operable to execute a computer readable medium embodying programmed instructions to perform desired functions in an illustrative embodiment.

Embodiments disclosed herein can take the form of software, hardware, firmware, or various combinations thereof. In one particular embodiment, software is used to direct a processing system of print review system 100 to perform the various operations disclosed herein. FIG. 9 illustrates a processing system 900 operable to execute a computer readable medium embodying programmed instructions to perform desired functions in an illustrative embodiment. Processing system 900 is operable to perform the above operations by executing programmed instructions tangibly embodied on computer readable storage medium 912. In this regard, embodiments of the invention can take the form of a computer program accessible via computer-readable medium 912 providing program code for use by a computer or any other instruction execution system. For the purposes of this description, computer readable storage medium 912 can be anything that can contain or store the program for use by the computer.

Computer readable storage medium 912 can be an electronic, magnetic, optical, electromagnetic, infrared, or semiconductor device. Examples of computer readable storage medium 912 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 900, being suitable for storing and/or executing the program code, includes at least one processor 902 coupled to program and data memory 904 through a system bus 950. Program and data memory 904 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 906 (including but not limited to keyboards, displays, pointing devices, etc.) can be coupled either directly or through intervening I/O controllers. Network adapter interfaces 908 may also be integrated with the system to enable processing system 900 to become coupled to other data processing systems or storage devices through intervening private or public networks. Modems, cable modems, IBM Channel attachments, SCSI, Fibre Channel, and Ethernet cards are just a few of the currently available types of network or host interface adapters. Display device interface 910 may be integrated with the system to interface to one or more display devices, such as printing systems and screens for presentation of data generated by processor 902.

Although specific embodiments were described herein, the scope of the invention is not limited to those specific embodiments. The scope of the invention is defined by the following claims and any equivalents thereof.

What is claimed is:

1. A system comprising:
a print review device comprising:
a memory that stores an image encompassing a test pattern printed by printheads of a printer; and
a controller configured to generate a Graphical User Interface (GUI), for presentation at a display, depicting states of the printheads based on the image, receive input from a user selecting one of the printheads, correlate the printhead with a portion of the image printed by nozzles of the printhead, and present the portion of the image for review at the GUI,
wherein the controller is further configured to identify locations on the portion that are correlated with the nozzles of the printhead, and to selectively highlight the locations based on state information for the nozzles.

2. The system of claim 1 wherein:
the controller is configured to selectively highlight the locations by directing the display to present symbols at the locations, wherein each type of symbols corresponds with a different state.

3. The system of claim 1 wherein:
the controller is configured to direct the display to apply a symbol to each location where a nozzle does not return to a ready state after multiple cleanings.

4. The system of claim 1 wherein:
the controller is configured to direct the display to highlight printheads experiencing an error state and printheads experiencing an unclean state via the GUI.

5. The system of claim 1 wherein:
the controller is configured to include controls at the GUI that enable an operator to advance exclusively through portions that are correlated with printheads in an error state.

6. The system of claim 1 wherein:
the controller is configured to direct the display to present a calendar that enables an operator to select historical images of test patterns for review via the GUI.

7. The system of claim 1 wherein:
the controller is configured to enhance a visibility of marks within the test pattern by converting the image to a monochrome color space.

8. The system of claim 1 wherein:
the controller is configured to process the image by scaling and rotating the image to place the test pattern in a predetermined orientation.

9. The system of claim 1 further comprising:
the printer, the printer being configured to mark print media with the test pattern.

10. A method comprising:
  storing an image encompassing a test pattern printed by printheads of a printer;
  directing a display to generate a Graphical User Interface (GUI), for presentation at a display, depicting states of the printheads based on the image;
  receiving input from a user selecting one of the printheads;
  correlating the printhead with a portion of the image printed by the nozzles of the printhead;
  presenting the portion of the image for review at the GUI;
  identifying locations on the portion that are correlated with the nozzles of the printhead; and
  selectively highlighting the locations based on state information for the nozzles.

11. The method of claim 10 wherein:
  selectively highlighting the locations comprises directing the display to present symbol at the locations, wherein each type of symbol corresponds with a different state.

12. A non-transitory computer readable medium embodying programmed instructions which, when executed by a processor, are operable for performing a method comprising:
  storing an image encompassing a test pattern printed by printheads of a printer;
  generating a Graphical User Interface (GUI), for presentation at a display, depicting states of the printheads based on the image;
  receiving input from a user selecting one of the printheads;
  correlating the printhead with a portion of the image printed by nozzles of the printhead;
  presenting the portion of the image for review at the GUI;
  identifying locations on the portion that are correlated with the nozzles of the printhead; and
  selectively highlighting the locations based on state information for the nozzles.

13. The medium of claim 12 wherein:
  selectively highlighting the locations comprises directing the display to present symbol at the locations, wherein each type of symbol corresponds with a different state.

14. The medium of claim 12 wherein the method further comprises:
  directing the display to apply a symbol to each location where a nozzle does not return to a ready state after multiple cleanings.

15. The medium of claim 12 wherein the method further comprises:
  directing the display to highlight printheads experiencing an error state via the GUI.

16. The medium of claim 12 wherein the method further comprises:
  including controls at the GUI that enable an operator to advance exclusively through portions that are correlated with printheads in an error state and printheads in an unclean state.

17. The medium of claim 12 wherein the method further comprises:
  directing the display to present a calendar that enables an operator to select historical images of test patterns for review via the GUI.

18. The medium of claim 12 wherein the method further comprises:
  enhancing a visibility of marks within the test pattern by converting the image to a monochrome color space.

19. The medium of claim 12 wherein the method further comprises:
  processing the image by scaling and rotating the image to place the test pattern in a predetermined orientation.

20. The medium of claim 12 wherein the method further comprises:
  marking print media with the test pattern via the printer.

* * * * *